3,024,248
ORGANIC SULFUR COMPOUNDS AND METHOD FOR PRODUCING SAME
Lincoln Harvey Werner, Summit, N.J., assignor to Ciba Pharmaceutical Products, Inc., Summit, N.J., a corporation of New Jersey
No Drawing. Filed Sept. 18, 1956, Ser. No. 610,656
13 Claims. (Cl. 260—319)

This invention relates to a new class of thianaphtheno [3,2-b]indoles. More particularly the invention is concerned with 10-RX-thianaphtheno[3,2-b]indoles having the nucleus of the formula:

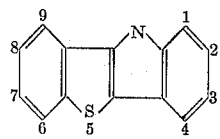

wherein X stands for a lower hydrocarbon radical and R represents an amino group. The invention is also concerned with the salts and quaternary ammonium compounds of these thianaphtheno[3,2-b]indoles, and methods for the preparation thereof.

A specific and preferred feature of my invention consists in 10-RX-thianaphtheno[3,2-b]indoles having the above described nucleus, wherein X stands for a lower alkylene radical, such as ethylene, propylene, butylene or pentylene and R represents a substituted amino group. Substituents of the amino group are preferably lower hydrocarbon radicals, such as alkyl groups, e.g. methyl, ethyl, propyl, butyl; alkylene radicals, which term also comprises alkylene radicals interrupted by hetero-atoms, such as oxygen, sulfur or nitrogen, e.g. 1,4-butylene, 1,5-pentylene, 1,6-hexylene, 3-oxa-pentylene(1,5) or 3-thia-pentylene(1,5); or cycloalkyl radicals, e.g. cyclopentyl, cyclohexyl or cycloheptyl. These lower hydrocarbon radicals have from 1 to about 7 carbon atoms. The amino group R is preferably disubstituted by such radicals and is, for example a dimethyl-, diethyl- or di-propyl-amino, piperidino, pyrrolidino, morpholino or thiamorpholino, cyclopentyl-methyl-amino or cyclohexyl-methyl-amino group.

In these compounds, the benzene nuclei may be substituted, for example by halogen, such as fluorine, bromine, iodine and especially chlorine, lower alkyl, e.g. methyl or ethyl, lower alkoxy, e.g. methoxy, ethoxy or methylenedioxy, nitro or amino.

As quaternary compounds, the lower alkyl ammonium compounds are preferred such as the lower alkyl ammonium halides, e.g. metho or etho chlorides, bromides or iodides, or corresponding organic sulfonic or alkyl sulfuric acid salts.

The new compounds are useful as antihistaminics. They also exhibit useful anesthetic activity and show antifungal effects, e.g. against *Candida albicans, Nocardia asteroides, Trichophyton interdigitalis, Blastomyces dermatiditis, Cryptococcus neoformans* and *Histoplasma capsulatum*.

Most valuable, especially from the point of antihistaminic activity of unusual long duration, are those 10-RX-thianaphtheno[3,2-b]indoles in which the substituent RX- corresponds to the formula:

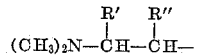

wherein one of the radicals R' and R" stands for hydrogen and the other for a member selected from the group consisting of hydrogen and methyl, and which are unsubstituted in the benzene nuclei or have halogen, lower alkyl, e.g. methyl or ethyl, or lower alkoxy, e.g. methoxy, ethoxy or methylenedioxy substituents, preferably in at least one of the positions 2–4 and 7 and 8; and their therapeutically useful acid addition salts. From this group of new compounds, I prefer those of the formula:

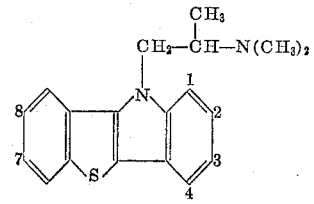

which, advantageously, may have a halogen atom, e.g. bromine, fluorine and especially chlorine, a lower alkyl group, e.g. methyl, or a lower alkoxy group, e.g. methoxy or methylenedioxy in at least one of the positions 7 and 8 and which may have, in addition thereto, such groups in positions 1 to 4.

The following compounds may be specifically mentioned for their antihistaminic activity: 10-(2'-dimethylamino-propyl)-thianaphtheno [3,2-b]indole, 7-chloro-10-(2'-dimethylaminoethyl)-thianaphtheno[3,2-b]indole, 2-chloro-10 - (2' - dimethylamino - propyl) - thianaphtheno[3,2-b]indole, 2 - chloro - 10-(2'-dimethylamino-propyl)-thianaphtheno[3,2-b]indole, 7-bromo-10-(2'-dimethylamino-propyl)-thianaphtheno[3,2-b]indole, 7-methoxy-10-(2'-dimethylamino-propyl)-thianaphtheno[3,2-b]indole, 2,7-dichloro - 10 - (2'-dimethylamino-propyl)-thianaphtheno [3,2-b]indole, 3-chloro-7-ethoxy-10-(2'-dimethylamino-propyl)-thianaphtheno[3,2-b]indole, 3,7-dimethoxy-10-(2'-dimethylamino-propyl) - thianaphtheno[3,2-b]indole and their therapeutically useful acid addition salts, and above all 7-chloro-10-(2'-dimethylamino-propyl)-thianaphtheno[3,2-b]indole, as well as 8-methyl-10-(2'-dimethylamino-propyl)-thianaphtheno[3,2-b]indole of the formula:

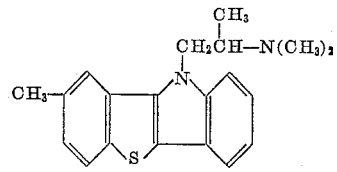

and their therapeutically useful acid addition salts such as the hydrochlorides and the tartrates.

Compounds with especially good antifungal activity are for example 4-chloro-10-(2'-dimethylamino-propyl)-thianaphtheno[3,2-b]indole and 8 - methyl - 10 - (2'-dimethylamino - propyl) - thianaphtheno[3,2-b]indole and their therapeutically active acid addition salts.

The new compounds may be used as medicaments in the form of pharmaceutical preparations, which contain the new compounds or salts thereof in admixture with a pharmaceutical organic or inorganic solid or liquid carrier suitable for enteral, parenteral or topical administration. For making up the preparations there can be employed substances which do not react with the new compounds, such as water, gelatine, lactose, starches, magnesium stearate, talc, vegetable oils, benzyl alcohols, gums, polyalkylene gylcols, petroleum jelly, cholesterol or any other known carrier for medicaments. The pharmaceutical preparations may be, for example, in the form of tablets, dragees, salves, creams, or in liquid form as solutions, suspensions or emulsions. If desired, they may contain auxiliary substances, such as preserving agents, stabilizing agents, wetting or emulsifying agents, salts for varying the osmotic pressure or buffers. They may also contain, in combination, other therapeutically useful substances. The new compositions contain preferably from about 50 mg. to about 600 mg. of the new active thianaphtheno-indole compounds per dosage unit. The actual dose administered in therapy depends largley on the condition of the individual patient and the desires of the practicing physician.

I prepare the new compounds by reacting a 10-unsubstituted thianaphtheno[3,2-b]indole with a chloro-amino-lower hydrocarbon. Such agents are, for example amino-ethylene-, aminopropylene-, amino-iso-propylene-, or amino-butylene-chlorides, wherein the amino group is advantageously a tertiary amino group as indicated above. The thianaphtheno-indoles used in this reaction are preferably in the form of their metal salts, e.g. sodium salt. Alternatively, the reaction is carried out in the presence of a condensing agent, preferably one which is capable of forming with the thianaphtheno[3,2-b]indole a metal salt, such as an alkali metal salt, for example sodium amide or hydride. If an aminoalkylhalogenide is used having a branched alkylene chain, isomerization may take place. Thus, by reaction with 1-dimethylamino-propyl-2 chloride a 2-dimethylamino-propyl compound may be obtained.

I prefer to carry out the reaction in an inert solvent such as dioxane, toluene, benzene, xylene or acetonitrile etc. Advantageously the thianaphtheno-indole is dissolved in the organic solvent and then converted into the sodium salt thereof, for example by reaction with sodamide. Then the desired halide is added and the mixture boiled. The reaction mixture is then worked up according to methods known in the art to recover the 10-substituted thianaphtheno-indoles.

The new compounds can also be obtained by reacting a 3-hydroxy-thianaphthene with an N-phenyl-N-(amino-lower hydrocarbon)-hydrazine according to the Fischer indole synthesis, e.g. by heating them together in acetic acid solution, or by condensing a 10-unsubstituted thianaphtheno[3,2-b]indole in the manner indicated above with a halogenated lower fatty acid amide and reducing the amide carbonyl group with lithium aluminum hydride. A halogenated lower fatty acid amide is for example a chloroacetic acid amide. Alternatively, the 10-unsubstituted thianaphtheno[3,2-b]indole may be condensed with a dihalogeno-lower hydrocarbon, the halogen atoms of which are situated at different carbon atoms, e.g. dibromo-ethane, so as to obtain a 10-(halogeno-lower hydrocarbon) substituted-thianaphtheno[3,2-b]indole and then reacted with the amine to exchange the halogen atom by the corresponding amino group.

Depending on the conditions used the new compounds are obtained in the form of the free bases or salts thereof. The salts can be converted into the free bases in the customary way, e.g. by reaction with alkali. The free bases can be transformed into their therapeutically useful acid addition salts by reaction with appropriate inorganic or organic acids such as hydrohalic acids, sulfuric acid, nitric acid, phosphoric acids, thiocyanic acid, acetic acid, propionic acid, oxalic acid, malonic acid, succinic acid, malic acid, tartaric acid, citric acid, methane sulfonic acid, ethane sulfonic acid, hydroxyethane sulfonic acid, benzene or toluene sulfonic acid or therapeutically active acids, e.g. salicyclic acid.

Tertiary amines can be converted into their quaternary ammonium compounds in the customary way by reaction with quaternizing agents. For this purpose I prefer to use lower alkylhalides, e.g. chlorides, bromides or iodides or lower dialkyl sulfates or organic sulfonic acid lower alkyl esters in a solvent such as methanol, acetone, ethyl acetate etc. From the quaternary ammonium salt the free ammonium base may be liberated by reaction with strong alkali or, for example silver oxide, or by employing an anion exchanger. By treatment of the free ammonium base with suitable acids as indicated above, the corresponding therapeutically useful ammonium salts may be prepared. It is also possible to convert one quaternary salt into another by double decomposition with appropriate salts.

The starting materials are embraced by the invention as far as they are new. In general they are prepared by the reaction of a 3-hydroxy-thianaphthene with a phenyl hydrazine as described in detail in the examples which follow. They illustrate the invention without limiting it. The temperatures are expressed in degrees centigrade.

Example 1

5.16 g. of 7-chloro-thianaphtheno[3,2-b]indole are suspended in 30 ml. toluene. 0.8 g. of sodamide is added and the reaction mixture stirred with refluxing for four hours. A solution of 2.72 g. 2-diethylamino-ethyl chloride in toluene is added and stirring and refluxing continued for an additional three hours. The reaction mixture is cooled to room temperature and filtered. The filtrate is evaporated to dryness, the oily residue dissolved in ethyl acetate and treated with anhydrous hydrogen chloride to precipitate the hydrochloride of 7-chloro-10-(2'-diethylaminoethyl)-thianaphtheno[3,2-b]indole of the formula:

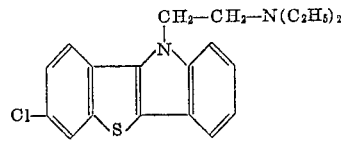

After recrystallization from iso-propanol the hydrochloride melts at 213–215°.

The 7-chloro-thianaphtheno[3,2-b]indole used as starting material can be obtained as follows:

27 g. of 6-chloro-3-hydroxy-thianaphthene are dissolved in 100 ml. glacial acetic acid. 16 g. phenyl hydrazine are added slowly with stirring at 80°. Heating is continued for 30 minutes. During this time the product separates. The reaction mixture is allowed to cool and the product, 7-chloro-thianaphtheno[3,2-b]indole, M.P. 269–270° is filtered off. It can be recrystallized from toluene or dimethylformamide.

Example 2

By substituting the 2-diethylaminoethyl chloride in Example 1 with 2.44 g. 1-dimethylamino-2-propyl chloride and working up in the manner indicated in Example 1 the hydrochloride of 7-chloro-10-(2'-dimethylamino-propyl)-thianaphtheno[3,2-b]indole of the formula:

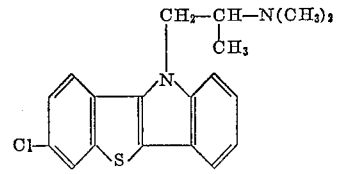

is obtained. After recrystallization from ethanol it melts at 262–264°.

This compound has an especially good and protracted antihistaminic activity. It can be used as antihistaminic in the form of pharmaceutical compositions, e.g. the following:

|  | G. |
|---|---|
| 7 - chloro - 10 - (2' - dimethylamino-propyl)-thianaphtheno[3,2-b]indole hydrochloride | 250.0 |
| Tragacanth BC | 20.0 |
| Lactose | 625.0 |
| 3A alcohol 50%, q.s. | |
| Talcum | 50.0 |
| Corn starch | 50.0 |
| Magnesium stearate | 5.0 |
| | 1000.0 |

The thianaphtheno-indole, tragacanth BC and lactose is triturated in a stainless steel pan. The mixture is granulated with sufficient quantity of 3A alcohol 50%. The wet mass is passed through a No. 10 stainless steel sieve and dried overnight without heat. The dried granules are again passed through the sieve. After the addition of the lubricants and thorough mixing, the mixture is again passed through the sieve. Then the mixture is punched into tablets of 200 mg. weight, containing 50 mg. of the active principle.

Example 3

By substituting 2.16 g. 2-dimethylaminoethyl chloride for the 2-diethylaminoethyl chloride used in Example 1 and proceeding as indicated in Example 1 there is obtained the hydrochloride of 7-chloro-10-(2'-dimethylamino-ethyl)-thianaphtheno[3,2-b]indole. It melts after recrystallization from dimethylformamide above 275°.

Example 4

By substituting 3.0 g. of 3-diethylamino-propyl chloride for the 2-diethylaminoethyl chloride used in Example 1 and proceeding as indicated in Example 1, there is obtained the hydrochloride of 7-chloro-10-(3'-diethylamino - propyl) - thianaphtheno[3,2-b]indole. It melts after recrystallization from dimethyl formamide at 185–187°.

Example 5

By substituting 2.45 g. 3-dimethylamino-propyl chloride for the 2-diethylamino-ethyl chloride used in Example 1 and proceeding as described in Example 1, there is obtained the hydrochloride of 7-chloro-10-(3'-dimethylamino-propyl) - thianaphtheno[3,2 - b]indole. It melts after recrystallization from dimethyl formamide above 275°.

Example 6

3.80 g. of 7-chloro-thianaphtheno[3,2-b]indole are suspended in 25 ml. toluene. 0.59 g. sodamide are added and the reaction mixture stirred with refluxing for four hours. A solution of 2.0 g. 2-pyrrolidinoethyl chloride in toluene is added and stirring and refluxing continued for an additional three hours. The reaction mixture is cooled to room temperature and filtered. The filtrate is evaporated to dryness and the oily residue is dissolved in ethyl acetate and treated with anhydrous hydrogen chloride to precipitate the hydrochloride of 7-chloro-10-(2'-pyrrolidinoethyl)-thianaphtheno[3,2-b]indole. It melts after recrystallization from dimethyl formamide above 300°.

Example 7

5.0 g. of 7-methoxy-thianaphtheno[3,2-b]indole are suspended in 35 ml. toluene. 0.8 g. sodamide is added and the mixture refluxed for three and one-half hours with stirring. 2.44 g. of 1-dimethylamino-2-propyl chloride in toluene are added and the reaction mixture refluxed for an additional three and one-half hours. After cooling, the reaction mixture is filtered and the filtrate concentrated under reduced pressure. The oily residue is dissolved in ethyl acetate and the hydrochloride precipitated by treatment with anhydrous hydrogen chloride. The hydrochloride of 7-methoxy-10-(2'-dimethylaminopropyl)-thianaphtheno[3,2-b]indole is filtered off and recrystallized from methanol. It melts at 272–274°.

The 7-methoxy-thianaphtheno[3,2-b]indole used as starting material can be obtained as follows:

7.0 g. of 3-hydroxy-6-methoxy-thianaphthene are dissolved in 35 ml. glacial acetic acid at 80°. 4.0 g. of phenyl hydrazine are added and heating continued for 30 minutes. After cooling to room temperature the 7-methoxy-thianaphtheno[3,2-b]indole which has crystallized is filtered off. After recrystallization from methylethyl ketone it melts at 275–277°.

Example 8

5.3 g. of 7-ethoxy-thianaphtheno[3,2-b]indole are suspended in 30 ml. toluene. 0.8 g. sodamide is added and the reaction mixture refluxed with stirring for four and three-quarters hours. 2.44 g. of 1-dimethylamino-2-propyl chloride in toluene solution are then added and refluxing continued for two hours. The resulting solution is filtered and concentrated under reduced pressure. The residue is dissolved in ethyl acetate and the hydrochloride of 7-ethoxy-10-(2'-dimethylamino-propyl)-thianaphtheno[3,2-b]indole is precipitated by treatment with hydrogen chloride. After recrystallization from dimethylformamide it melts at 295–297°.

Example 9

5.0 g. of 3,7-dichloro-thianaphtheno[3,2-b]indole are suspended in 30 ml. toluene, 0.75 g. sodamide is added and the reaction mixture refluxed for two and one-half hours. 2.1 g. of 3-dimethylaminopropyl chloride are added and refluxing continued for two and one-half hours. The solution is then cooled and filtered. On addition of a solution of hydrogen chloride in ethyl acetate the hydrochloride of 3,7-dichloro-10-(3'-dimethylamino-propyl)-thianaphtheno[3,2-b]indole is precipitated. After recrystallization from dimethylformamide it melts above 275°.

The 3,7-dichloro-thianaphtheno[3,2-b]indole used as starting material is obtained as follows:

18.4 g. of 6-chloro-3-hydroxy-thianaphthene are dissolved in 100 ml. glacial acetic acid with warming. 14.3 g. of p-chlorophenylhydrazine are added and the reaction mixture heated to 80° for 30 minutes. The product crystallizes. After cooling it is filtered off and recrystallized from toluene. The 3,7-dichlorothianaphtheno-[3,2-b]indole thus obtained melts at 260–262°.

Example 10

5.80 g. of 3-chloro-7-methoxy-thianaphtheno[3,2-b]indole are suspended in 40 ml. toluene, 0.8 g. sodamide is added and the reaction mixture refluxed for two and one-half hours. 2.45 g. of 1-dimethylamino-2-propyl chloride in toluene are added and refluxing continued for four hours. After cooling, the solution is filtered and the filtrate evaporated to dryness. The residue, 3-chloro-7-methoxy - 10 - (2'-dimethylamino-propyl)-thianaphtheno [3,2-b]indole melts at 137° after recrystallization from ethyl acetate. The hydrochloride, prepared from it by adding anhydrous hydrogen chloride to its ethyl acetate solution melts at 270–272°, after recrystallization from dimethylformamide-ether.

The 3-chloro - 7 - methoxy-thianaphtheno[3,2-b]indole used as starting material can be obtained as follows:

9 g. of 3-hydroxy-6-methoxy-thianaphthene are dissolved in 40 ml. of glacial acetic acid, 7.1 g. p-chlorophenyl hydrazine are added and the reaction mixture kept at 80° for 30 minutes. The product crystallizes and after cooling the crystalline product is filtered off and recrystallized from dimethylformamide. The thus-obtained 3-chloro - 7 - methoxy-thianaphtheno[3,2-b]indole melts above 300°.

Example 11

6.35 g. of 3-chloro-7-ethoxy-thianaphtheno[3,2-b]indole is suspended in 40 ml. toluene, 0.8 g. sodamide is added and the reaction mixture refluxed for five hours. 2.62 g. of 1-dimethylamino-2-propyl chloride in toluene are added and refluxing continued for an additional five hours. On cooling and standing at room temperature the material crystallizes. It is filtered off and recrystallized from benzene. The product, 3-chloro-7-ethoxy-10-(2'-dimethylaminopropyl) - thianaphtheno[3,2 - b]indole melts at 174–176°. By adding anhydrous hydrogen chloride to its ethyl acetate solution the hydrochloride, M.P. 282–285° is obtained.

The 3-chloro-7-ethoxy-thianaphtheno[3,2-b]indole used as starting material can be obtained as follows:

5.82 g. of 3-hydroxy-6-ethoxy-thianaphthene are dissolved in 30 ml. glacial acetic acid, 4.26 g. p-chlorophenyl-hydrazine are added and the reaction mixture kept at 80° for 30 minutes. The product crystallizes and, after cooling to room temperature, is filtered off and recrystallized from methylethyl ketone. The thus-obtained 3-chloro-7-ethoxy-thianaphtheno[3,2-b]indole melts at 295–300°.

Example 12

By using 2.62 g. 3-dimethylaminopropyl chloride in place of the 1-dimethylamino-2-propyl chloride employed is Example 11 and otherwise proceeding as indicated in Example 11 the hydrochloride of 3-chloro-7-ethoxy-10-(3'-dimethylamino-propyl)-thianaphtheno[3,2-b]indole is obtained. It melts after recrystallization from dimethyl formamide at 292–294°.

*Example 13*

By substituting 3.0 g. 2-piperidinoethyl chloride for the 2-diethylaminoethyl chloride used in Example 1 and proceeding as described in Example 1, there is obtained the hydrochloride of 7-chloro-10-(2'-piperidinoethyl)-thianaphtheno[3,2-b]indole. It melts after recrystallization from ethanol at 273–278°.

*Example 14*

By substituting 3.0 g. 2-morpholinoethyl chloride for the 2-diethylaminoethyl chloride used in Example 1 and proceeding as described in Example 1, there is obtained the hydrochloride of 7-chloro-10-(2'-morpholinoethyl)-thianaphtheno[3,2-b]indole. It melts after recrystallization from dimethylformamide-ethyl acetate at 288–292°.

*Example 15*

4.0 g. of 7-chloro-10-(2'-dimethylamino-propyl)-thianaphtheno[3,2-b]indole are dissolved in 15 ml. methanol. A solution of 7 g. methyl chloride in 20 ml. methanol is added and the reaction mixture heated for one hour to 100° in a sealed tube. The solution is concentrated under reduced pressure. On addition of ethylacetate the methochloride of 7-chloro-10-(2'-dimethylamino-propyl)-thianaphtheno[3,2-b]indole crystallizes. It has the following formula:

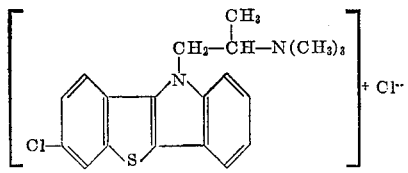

After recrystallization from ethanol it melts at 247–250°. It crystallizes with 1 mole of ethanol.

*Example 16*

4.0 g. of thianaphtheno[3,2-b]indole are suspended in 35 ml. toluene. 0.7 g. of sodamide is added and the reaction mixture stirred with refluxing for three and one-half hours. A solution of 2.18 g. 1-dimethylamino-2-propyl chloride is added, and stirring and refluxing are continued for four hours. The reaction mixture is cooled to room temperature and filtered. The filtrate is evaporated to dryness. The oily residue is dissolved in ethyl acetate and treated with anhydrous hydrogen chloride to precipitate the hydrochloride of 10-(2'-dimethylamino-propyl)-thianaphtheno[3,2-b]indole of the following formula:

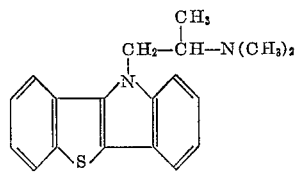

After recrystallization from iso-propanol-ether, it melts at 202–206°.

*Example 17*

3.2 g. of 7-chloro-9-methyl-thianaphtheno[3,2-b]indole are suspended in 30 ml. toluene, 0.5 g. sodamide is added and the reaction mixture refluxed for two and one-half hours with stirring. 1.44 g. of 1-dimethylamino-2-propyl chloride in toluene solution are added and refluxing continued for two and one-half hours. After cooling, the solution is filtered and concentrated under reduced pressure. The oily residue is dissolved in ethyl acetate. The hydrochloride of the 7-chloro-9-methyl-10-(2'-dimethylamino-propyl)-thianaphtheno[3,2-b]indole is precipitated by addition of anhydrous hydrogen chloride. After recrystallization from an isopropanol-ether mixture the hydrochloride melts at 252–255°.

The 7-chloro-9-methyl-thianaphtheno[3,2-b]indole used as starting material is prepared as follows:

8.0 g. of 6-chloro-3-hydroxy-4-methyl-thianaphthene are dissolved in 40 ml. of glacial acetic acid, 6.0 ml. phenyl hydrazine are added and the reaction mixture heated on the steam bath for one-half hour. A vigorous evolution of nitrogen occurs. On cooling 7-chloro-9-methyl-thianaphtheno[3,2-b]indole crystallizes. It is filtered off and recrystallized from benzene, M.P. 168–172°.

*Example 18*

5.7 g. of 3,7-dimethoxy-thianaphtheno[3,2-b]indole are suspended in 40 ml. toluene, 0.8 g. sodamide is added and the reaction mixture refluxed with stirring for six and one-half hours. 2.44 g. of 1-dimethylamino-2-propyl chloride in toluene solution are added and refluxing continued for five and one-half hours. After cooling, the reaction mixture is filtered and concentrated under reduced pressure. The oily residue is dissolved in ethyl acetate. By introducing anhydrous hydrogen chloride the hydrochloride of 3,7-dimethoxy-10-(2'-dimethylamino-propyl)-thianaphtheno[3,2-b]indole is precipitated. After recrystallization from methanol it melts at 244–246°.

The 3,7-dimethoxy-thianaphtheno[3,2-b]indole used as starting material can be prepared as follows:

12.0 g. of 3-hydroxy-6-methoxy-thianaphthene, 40 ml. glacial acetic acid and 7.8 g. p-methoxyphenylhydrazine are heated to 80° for 30 minutes. During the heating period 3,7-dimethoxy-thianaphtheno[3,2-b]indole crystallizes. After cooling it is filtered off and recrystallized from dimethyl-formamide-ether. It melts at 253–255°.

*Example 19*

5.0 g. of 7-chloro-10-(2'-dimethylamino-propyl)-thianaphtheno[3,2-b]indole hydrochloride are treated with diluted potassium carbonate solution and the mixture extracted with chloroform. Evaporation of the chloroform leaves a crystalline residue, which after recrystallization from isopropanol melts at 105–108° and represents the free base.

1.03 g. of the thus-obtained 7-chloro-10-(2'-dimethylamino-propyl)-thianaphtheno[3,2-b]indole are dissolved in 30 ml. ether and 0.3 g. methane sulfonic acid dissolved in 10 ml. ether are added. The methane-sulfonate of 7-chloro-10-(2'-dimethylamino-propyl)-thianaphtheno[3,2-b]indole precipitates immediately. After recrystallization from iso-propanol it melts at 162–163°.

1.03 g. of 7-chloro-10-(2'-dimethylamino-propyl)-thianaphtheno[3,2-b]indole are dissolved in 30 ml. ether and a solution of 0.45 g. d-tartaric acid in 5 ml. ethanol added. The tartrate of 7-chloro-10-(2'-dimethylamino-propyl)-thianaphtheno[3.2-b]indole precipitates immediately. After recrystallization from iso-propanol-ether it softens at 75° and foams at 92°.

0.70 g. of 7-chloro-10-(2'-dimethylamino-propyl)-thianaphtheno[3,2-b]indole is dissolved in 20 ml. ether. 0.2 g. sulfuric acid is dissolved in 10 ml. ether and added. The sulfate of 7-chloro-10-(2'-dimethylamino-propyl)-thianaphtheno[3,2-b]indole precipitates immediately. It is filtered off and recrystallized from alcohol-ether, M.P. 197–198°.

In a similar manner other salts can be obtained, for example the nitrate, phosphate, citrate or oxalate.

*Example 20*

5.80 g. of 7-chloro-3-methoxy-thianaphtheno[3,2-b]indole are suspended in 40 ml. toluene. After addition of 0.8 g. sodamide the reaction mixture is refluxed with stirring for two and one-half hours.

2.45 g. 1-dimethylamino-2-propyl chloride in toluene solution are then added and refluxing and stirring continued for two and one-half hours. After cooling, the reaction mixture is filtered and the filtrate evaporated to dryness. The oily residue is dissolved in ether and the hydrochloride of 7-chloro-3-methoxy - 10 - (2' - dimethylamino-propyl)-thianaphtheno[3,2-b]indole of the following formula:

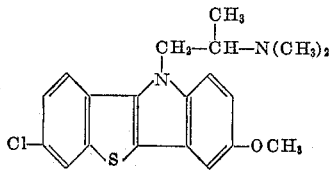

precipitates by addition of anhydrous hydrogen chloride in ethyl acetate. After recrystallization from dimethylformamide-isopropanol the hydrochloride melts at 225–229°. The 7-chloro-3-methoxy-thianaphtheno[3,2-b]indole used as starting material can be obtained as follows:

10 g. of 6-chloro-3-hydroxy-thianaphthene are dissolved in 100 ml. glacial acetic acid. 7.0 g. of p-methoxy-phenylhydrazine are added and the reaction mixture heated for 30 minutes on the steam bath. On cooling the 7-chloro-3-methoxy-thianaphtheno[3,2-b]indole which is a new compound crystallizes. It is filtered off and recrystallized from toluene, M.P. 232–234°.

Example 21

13.41 g. of 3-nitro-thianaphtheno[3,2-b]indole are suspended in 100 ml. dry toluene. 2 g. sodamide are added together with 50 ml. toluene and the suspension heated under reflux for three hours. 7.5 g. 2-diethylamino-ethyl chloride dissolved in 25 ml. toluene are then added and the refluxing continued for another six hours. After cooling, 200 ml. water are added and the liquid layers freed from solid material by filtration. The toluene layer is diluted with ether and extracted with 350 ml. 2N hydrochloric acid. To the hydrochloric acid solution strong hydrochloric acid is added, whereupon the yellow hydrochloride of 3-nitro-10-(2'-diethylamino-ethyl)-thianaphtheno[3,2-b]indole crystallizes. It is washed with ethanol and recrystallized from ethanol. The melting point is 258–259°. The free base melts at 88–90°.

Example 22

20.0 g. 3-hydroxy-thianaphthene and 27.55 g. 1-phenyl-1-(2'-diethylamino-ethyl)-hydrazine are heated in 250 ml. acetic acid to 100–110° for two hours. The solution is cooled, filtered, acidified to Congo red by addition of saturated alcoholic hydrochloric acid, again filtered and evaporated to dryness. The residue is taken up in 200 ml. of water and the turbid liquid cleared with ether. Concentrated hydrochloric acid is added to the aqueous solution whereupon an oily hydrochloride separates which, when dissolved in little alcohol, crystallizes. It is recrystallized from isopropyl alcohol. The thus-obtained hydrochloride of 10-(2'-diethylamino-ethyl)-thianaphtheno[3,2-b]indole melts at 191 to 193°.

Example 23

5.2 g. 3-chloro-thianaphtheno[3,2-b]indole are suspended in 40 ml. toluene and 2.06 g. of a sodium hydride suspension (0.48 g. sodium hydride) added. The reaction mixture is refluxed for one and one-half hours. A solution of 2.44 g. 1-dimethylamino-2-propyl chloride is added and refluxing continued for four and one-half hours. After cooling, the reaction mixture is filtered and the filtrate evaporated to dryness. The residue is dissolved in 30 ml. ethyl acetate and the hydrochloride of 3-chloro - 10 - (2'-dimethylamino-propyl)-thianaphtheno[3,2-b]indole precipitated by addition of anhydrous hydrochloric acid in ethyl acetate. It melts after recrystallization from isopropanol at 245° with decomposition.

The starting material can be obtained as follows:

15 g. of 3-hydroxy thianaphthene are dissolved in 120 ml. glacial acetic acid at 80–90°. 14 g. p-chlorophenyl hydrazine are added and the reaction mixture kept for 30 minutes at 80–100°. After several minutes crystals separate. At the end of the reaction time, the mixture is cooled and the product filtered off, washed with acetic acid and recrystallized from toluene. The thus-obtained 3-chloro-thianaphtheno[3,2-b]indole melts at 281–283°.

Example 24

By substituting 8-chloro-thianaphtheno[3,2-b]indole for the 3-chloro-thianaphtheno[3,2-b]indole in Example 23 and proceeding in the manner described in that example, 8-chloro-10-(2'-dimethylamino-propyl)-thianaphtheno[3,2-b]indole hydrochloride is obtained. It melts after recrystallization from ethanol at 255–256° (with decomposition).

Example 25

5.2 g. 6-chloro-thianaphtheno[3,2-b]indole are suspended in 40 ml. toluene, 0.8 g. sodium amide is added and the mixture refluxed for four hours. 2.44 g. of 1-dimethylamino-2-propyl chloride are added and the mixture heated to 55–65° for four hours. After cooling the mixture is filtered and the filtrate evaporated to dryness. The residue is dissolved in 40 ml. ethyl acetate and the hydrochloride of 6-chloro-10-(2'-dimethylamino-propyl)-thianaphtheno[3,2-b]indole precipitated with anhydrous hydrochloric acid. After recrystallization from ethanol it melts at 256–259°.

Example 26

By substituting 3-dimethylamino-propylchloride for 1-dimethylamino-2-propyl chloride in Example 25, and proceeding in the manner described in that Example, 6-chloro - 10 - (3' - dimethylamino-propyl)-thianaphtheno-[3,2-b]indole hydrochloride is obtained, M.P. 172–176° after recrystallization from isopropanol.

Example 27

By substituting 8-methyl-thianaphtheno[3,2-b]indole in Example 25 for the 6-chloro-derivative and proceeding in the manner described in that example 8-methyl-10-(2'-dimethylamino-propyl)-thianaphtheno[3,2 - b]indole hydrochloride, M.P. 204–205° is obtained.

Example 28

6.7 g. of thianaphtheno[3,2-b]indole are suspended in 50 ml. toluene, 1.2 g. sodamide is added and the mixture refluxed for four hours. A solution of 5.8 g. 3-(N-cyclopentyl-N-methylamino)-propyl chloride in toluene is added and the temperature kept at 85–90° for four hours. After cooling, the reaction mixture is filtered and the filtrate evaporated to dryness. The residue is dissolved in ethyl acetate and the hydrochloride of 10-[3'-(N-cyclopentyl-N-methyl-amino)-propyl]-thianaphtheno[3,2-b]indole precipitated with anhydrous hydrochloric acid. It melts at 200–204° after treatment with ethyl acetate.

Example 29

5.6 g. of 10-(2'-cyanoethyl)-thianaphtheno[3,2-b]indole are added to a solution of 3.04 g. lithium aluminum hydride in 100 ml. ether. The reaction mixture is stirred at reflux for 20 hours. The excess lithium aluminum hydride is decomposed with ethyl acetate, and 3.0 ml. water, 6 ml. 15 percent aqueous hydroxide and 9 ml. water is then added. The precipitate that forms is filtered off and the ether filtrate washed with water, dried and evaporated to dryness. The residue is dissolved in 40 ml. ethyl acetate and the hydrochloride of 10-(3'-amino-propyl)-thianaphtheno[3,2-b]indole precipitated by addition of anhydrous hydrochloric acid. After recrystallization from dimethyl formamide it melts above 300°.

Example 30

7.73 g. of 7-chloro-thianaphtheno[3,2-b]indole are suspended in 60 ml. toluene, 1.2 g. sodamide are added and the reaction mixture refluxed for four hours. A solution of 3.56 g. 2-ethylamino-ethyl chloride in toluene is added dropwise at reflux over a period of one and one-half hours. Refluxing is continued for 16 hours. After cooling the reaction mixture is filtered. The filtrate is concentrated under reduced pressure and the hydrochloride of 7-chloro-10-(2'-ethylamino-ethyl)-thianaphtheno[3,2-b]indole precipitated with anhydrous hydrochloric acid. After recrystallization from dimethyl formamide it melts at 310–314° (with decomposition).

*Example 31*

5.06 g. of 7-methoxy-thianaphtheno[3,2-b]indole are suspended in 35 ml. toluene, 0.8 g. sodamide is added and the reaction mixture refluxed for four hours. 3.25 g. 2-piperidinoethyl chloride in toluene solution are added and refluxing continued for four hours. After cooling, the reaction mixture is filtered, and the filtrate evaporated to dryness. The residue is dissolved in ethyl acetate and the hydrochloride of 7-methoxy-10-(2'-piperidino-ethyl)-thianaphtheno[3,2-b]indole precipitated by addition of anhydrous hydrochloric acid. After recrystallization from ethanol the product melts at 258–261°.

An alternate procedure consists of refluxing 12.7 g. 7-methoxy-thianaphtheno[3,2-b]indole in 90 ml. toluene with 1.95 g. sodamide for four hours, adding 18.8 g. 1,2-dibromoethane and refluxing an additional 16 hours. After cooling the reaction mixture is filtered and the filtrate evaporated to dryness. The residue is washed with 35 ml. hot ethanol, filtered off and recrystallized from ethyl acetate. The thus-obtained 10-(2'-bromo-ethyl)-7-methoxy-thianaphtheno[3,2-b]indole melts at 159–162°.

0.7 g. of 7-ethoxy-10-(2'-bromo-ethyl)-thianaphtheno[3,2-b]indole are dissolved in 10 ml. benzene, 0.86 g. piperidine are added and the reaction mixture refluxed for two hours. After cooling the reaction mixture is dissolved in ethyl acetate and the hydrochloride of 7-methoxy-10-(2'-piperidino-ethyl)-thianaphtheno[3,2-b]indole precipitated with anhydrous hydrochloric acid, filtered off and recrystallized from ethanol.

According to a third method 10.4 g. 7-methoxy-thianaphtheno[3,2-b]indole are suspended in 80 ml. toluene, 1.6 g. sodamide are added and the reaction mixture refluxed for four hours. 7.27 g. of N-(α-chloroacetyl)-piperidine are added and refluxing continued for an additional four hours. After cooling, the reaction mixture is filtered. The filter residue is washed with ethanol and water, dried and recrystallized from dimethyl formamide to give the piperidide of 7-methoxy-thianaphtheno[3,2-b]indole-10-acetic acid, M.P. 318–320° (with decomposition).

3.8 g. of this piperidide are added gradually to a solution of 1.0 g. lithium aluminum hydride in 30 ml. ether. The reaction mixture is refluxed with stirring for 16 hours. After cooling, 3 ml. ethyl acetate, 1.3 ml. water, 2.0 ml. 15 percent aqueous sodium hydroxide and 3ml. water are added. The reaction mixture is filtered, the ether dried over anhydrous sodium sulfate and evaporated to dryness. The crystalline residue is dissolved in 30 ml. ethyl acetate and the hydrochloride of 7-methoxy-10-(2'-piperidino-ethyl)-thianaphtheno[3,2-b]indole precipitated by addition of anhydrous hydrochloric acid.

*Example 32*

6.04 g. of 7-bromo-thianaphtheno[3,2-b]indole are refluxed for four hours in 40 ml. toluene with 0.8 g. sodamide. 2.68 g. of 1-dimethylamino-2-propyl chloride in toluene solution are then added and the temperature kept at 55–60° for four hours. After cooling the reaction mixture is filtered and the filtrate evaporated to dryness. The residue is dissolved in ethyl acetate and the hydrochloride or 7-bromo-10-(2'-dimethylamino-propyl)-thianaphtheno[3,2-b]indole precipitated by addition of anhydrous hydrochloric acid. After recrystallization from ethanol it melts at 257–258° (with decomposition).

The starting material can be obtained as follows:

37.2 g. of m-bromo-thiophenol are dissolved in a solution of 18 g. sodium hydroxide in 18 ml. water and 90 ml. ethanol. A solution of 20.4 g. chloro-acetic acid in 50 ml. ethanol is added. Heat is evolved. After stirring for one hour, the reaction mixture is refluxed for two hours, then cooled and filtered. The filter residue is dissolved in 400 ml. water and acidified, whereupon m-bromo-phenylthioglycollic acid precipitates. It is filtered off. The filtrate is concentrated under reduced pressure, the residue dissolved in 400 ml. water and the solution acidified. An additional quantity of m-bromo-phenylthioglycollic acid is precipitated. It is filtered off and combined with the first crop. After recrystallization from benzene m-bromo-phenylthioglycollic acid melts at 87–89°. 30 g. thereof are suspended in 90 g. tetrachloroethane and 17.7 g. phosphorous trichloride. The reaction mixture is heated slowly with stirring to 90° and kept at that temperature for three and one-half hours. After standing at room temperature overnight, the solution is added over a 15 minute period to a slurry of 17.8 g. aluminum chloride in 180 g. tetrachloroethane at 60–65°. Heating is continued for 30 minutes. The reaction mixture is then poured into a mixture of 300 g. ice and 250 ml. water with stirring. The tetrachloroethane solution is separated, washed with water, dried and concentrated. On cooling, the 6-bromo-3-hydroxy-thianaphthene crystallizes. It is filtered off, M.P. 158–160°. 11.7 g. thereof are dissolved in 117 ml. glacial acetic acid. 6.1 g. phenyl hydrazine are added at 80°. The temperature is kept at 80° for one hour. After cooling, the product is filtered off. After recrystallization from methyl ethyl ketone the thus-obtained 7-bromo-thianaphtheno[3,2-b]indole melts at 280–282°.

*Example 33*

4.6 g. 2,7-dichloro-thianaphtheno[3,2-b]indole are refluxed in 35 ml. toluene with 420 mg. finely dispersed sodium hydride for two hours. 2.12 g. 1-dimethylamino-2-propyl chloride are added and the reaction mixture refluxed for four hours. After cooling the reaction mixture is filtered and the filtrate evaporated to dryness. The residue is dissolved in ethyl acetate and the hydrochloride of 2,7-dichloro-10-(2'-dimethylamino-propyl)-thianaphtheno[3,2-b]indole precipitated by addition of anhydrous hydrochloric acid. After recrystallization from ethanol it melts at 267–270°.

The starting material can be obtained as follows:

14.0 g. of 6-chloro-3-hydroxy-thianaphthene are dissolved in 120 ml. glacial acetic acid, and warmed to 80°. 12.0 g. m-chloro-phenyl hydrazine are added and the reaction mixture heated for one hour on the steam bath. After standing for 16 hours at room temperature the product, 2,7-dichloro-thianaphtheno[3,2-b]indole is filtered off and recrystallized from benzene, M.P. 237–239°.

*Example 34*

5.2 g. 2-chloro-thianaphtheno[3,2-b]indole are refluxed with 35 ml. toluene and 0.8 g. sodium amide for four hours. 2.44 g. 1-dimethylamino-2-propyl chloride are added and refluxing continued for an additional four hours. After cooling the solution is filtered and evaporated to dryness. The residue is dissolved in ethyl acetate and the hydrochloride of 2-chloro-10-(2'-dimethylamino-propyl)-thianaphtheno[3,2-b]indole precipitated by addition of anhydrous hydrochloric acid. After recrystallization from ethanol it melts at 182–184°.

By substituting 3-dimethylamino-propyl chloride for the 1-dimethylamino-2-propyl chloride in the above reaction, and proceeding as indicated above, 2-chloro-10-(3'-dimethylamino-propyl)-thianaphtheno[3,2-b]indole hydrochloride is obtained. It melts at 261–263° after recrystallization from ethanol.

By substituting 2.95 g. 2-piperidino-ethyl chloride for the 2.44 g. 1-dimethylamino-2-propyl chloride in the above reaction and proceeding as indicated above, the hydrochloride of 2-chloro-10-(2-piperidino-ethyl)-thianaphtheno[3,2-b]indole is obtained. After recrystallization from ethanol it melts at 264–266°.

14 g. 4-chloro-thianaphtheno[3,2-b]indole and 2.14 g. sodamide are refluxed for four hours in 94 ml. toluene. A solution of 6.56 g. 1-dimethylamino-2-propyl chloride in toluene is added and the reaction mixture refluxed for an additional four hours. After cooling, the reaction mixture is filtered and the filtrate evaporated to dryness. The residue is dissolved in ethyl acetate and the hydrochloride of 4-chloro-10-(2'-dimethylamino-propyl)-thianaphtheno[3,2-b]indole precipitated by addition of anhydrous hydrochloric acid. After recrystallization from ethanol it melts at 225–227°.

By using 5.2 g. 4-chloro-thianaphtheno[3,2-b]indole, 35 ml. toluene, 0.8 g. sodamide and 2.95 g. 2-piperidino-ethyl chloride and following the above procedure the hydrochloride of 4-chloro - 10 - (2 - piperidino-ethyl)-thianaphtheno[3,2-b]indole is obtained. After recrystallization from ethanol it melts at 284–286°.

The starting materials are obtained as follows:

33.3 g. of 3-hydroxy-thianaphthene are dissolved in 310 ml. glacial acetic acid. At 80–90°, 26.3 g. m-chlorophenyl hydrazine are added and the reaction mixture heated for one hour to 80–90°. After cooling, crystals separate and are filtered off. After recrystallization from benzene the product melts at 265–268°. According to analysis and infrared spectrum it is 2-chloro-thianaphtheno[3,2-b]indole. The acetic acid mother liquors of this compound are concentrated under reduced pressure to give a solid which on recrystallization from benzene yields a product, M.P. 164–166°, which is identified by analysis and infrared spectrum as 4-chloro-thianaphtheno-[3,2-b]indole.

*Example 35*

15.4 g. 8-bromo-thianaphtheno[3,2-b]indole and 2.0 g. sodamide are refluxed in 88 ml. toluene for four hours. A solution of 6.1 g. 1-dimethylamino-2-propyl chloride in toluene is added and refluxing continued for four hours. After cooling the reaction mixture is filtered and the filtrate evaporated to dryness. The residue is dissolved in ethyl acetate and the hydrochloride of 8-bromo-10 - (2' - dimethylamino-propyl)-thianaphtheno[3,2-b] indole precipitated by addition of anhydrous hydrochloric acid. After recrystallization from ethanol it melts at 260–262°.

The starting material is obtained as follows:

27.1 g. 5-bromo-3-hydroxy thianaphthene are dissolved in 216 ml. glacial acetic acid at 80–90°, 13.8 g. phenyl hydrazine are added and the reaction mixture heated for one hour on the steam bath. After cooling the 8-bromo-thianaphtheno[3,2-b]indole is filtered off and recrystallized from benzene. It melts at 223–225°.

*Example 36*

4.5 g. of 8-fluoro-thianaphtheno[3,2-b]indole are refluxed with 0.8 g. sodamide in 35 ml. toluene for four hours. 2.44 g. 1-dimethylamino-2-propyl chloride in toluene solution are added and refluxing continued for four hours. After cooling, the reaction mixture is filtered and the filtrate evaporated to dryness. The residue is dissolved in ethyl acetate and the hydrochloride of 8-fluoro - 10 - (2'-dimethylamino-propyl)-thianaphtheno-[3,2-b]indole precipitated by addition of anhydrous hydrochloric acid. After recrystallization from ethanol it melts at 255–257°.

The starting material is obtained as follows:

10.66 g. of potassium hydroxide are dissolved in 193 ml. ethanol, 12.2 g. p-fluoro-thiophenol and 8.98 g. chloro-acetic acid are added. The reaction mixture is refluxed for four hours and then worked up as described in Example 32. After recrystallization from ethanol the p-fluoro-phenyl thioglycollic acid melts at 62–64°.

16.56 g. p-fluoro-phenyl thioglycollic acid in 34 ml. tetrachloro-ethane are treated with 12.9 g. phosphorous trichloride as described in Example 32, then reacted with 12.3 g. powdered aluminum chloride in 68 ml. tetrachloroethane and worked up as also described in Example 32. The 5-fluoro-3-hydroxy-thianaphthene is obtained in a crude form as gummy crystals, which can be reacted directly with phenyl hydrazine as follows: 12.6 g. thereof are dissolved in 135 ml. glacial acetic acid at 80–90°, 8.65 g. phenyl hydrazine are added and the reaction mixture heated for three hours on the steam bath. After cooling the crystalline product is filtered off and recrystallized from benzene. The so-obtained 8-fluoro-thianaphtheno[3,2-b]indole melts at 239–241°.

*Example 37*

16.3 g. of 7,8-dichloro-thianaphtheno[3,2-b]indole are refluxed for four hours with 2.23 g. sodamide in 98 ml. toluene, 6.84 g. 1-dimethylamino-2-propyl chloride in toluene solution are added and refluxing continued for four hours. After cooling the reaction mixture is filtered and the filtrate evaporated to dryness. The residue is dissolved in ethyl acetate and the hydrochloride of 7,8-dichloro-10-(2'-dimethylamino - propyl) - thianaphtheno-[3,2-b]indole precipitated by addition of anhydrous hydrochloric acid.

After recrystallization from ethanol it melts at 267–269°.

The starting material can be prepared as follows:

22.88 g. of 3,4-dichloro-benzenesulfonyl chloride are added to 100 ml. concentrated hydrochloric acid. 45.1 g. tin granules (30 mesh) are added and the reaction mixture heated for two and one-half hours until all tin has dissolved. The reaction mixture is then steam distilled. The distillate is extracted with ether, the ether solution concentrated and the residue distilled under reduced pressure. The thus-obtained 3,4-dichloro-thiophenol boils at 76–78° at 0.25 mm./Hg.

17.95 g. potassium hydroxide are dissilved in 325 ml. ethanol, 28.8 g. 3,4-dichlorothiophenol and 15.12 g. chloroacetic acid added and the reaction mixture refluxed for four hours. The reaction mixture is worked up as in Example 32 to give 3,4-dichloro-phenyl thioglycollic acid, M.P. 71–72°.

40.1 g. thereof are treated with 24.72 g. phosphorous trichloride in 65 ml. tetrachloroethane, then reacted with 23.8 g. powdered aluminum chloride in 130 ml. tetrachloro ethane, and worked up as described in Example 32. The crude 5,6-dichloro-3-hydroxy-thianaphthene is obtained as gummy crystals which can be reacted without further purification as follows: 35 g. thereof are dissolved in 312 ml. glacial acetic acid at 80–90°. 20 g. phenyl hydrazine are added and the reaction mixture warmed on the steam bath for one hour. After cooling the crystalline product is filtered off and recrystallized from benzene. The thus-obtained 7,8-dichloro-thianaphtheno-[3,2-b]indole melts at 247–249°.

*Example 38*

3.06 g. of N'-phenyl-N'-(5-diethylamino-2-pentyl)-hydrazine are dissolved in 19.8 ml. glacial acetic acid and 1.98 g. of 6-methoxy-3-hydroxythianaphthene are added. The reaction mixture is refluxed for two hours, filtered, and concentrated under reduced pressure. Anhydrous hydrochloric acid in ethyl acetate is added and the solution concentrated to a thick oil. On addition of water unreacted 6-methoxy-3-hydroxy-thianaphthene separates and is filtered off. The clear aqueous solution is concentrated to a heavy oil which is extracted with concentrated hydrochloric acid. The hydrochloride of 7-methoxy - 10-(5'-diethylamino-2' - pentyl)-thianaphtheno-[3,2-b]indole is insoluble in concentrated hydrochloric acid and remains as an oil. It is dissolved in water, the base liberated by addition of potassium carbonate and extracted into ether. Addition of a solution of d-tartaric acid in ethanol precipitates the d-tartrate of 7-methoxy- 10-(5'-diethylamino - 2' - pentyl) - thianaphtheno[3,2-b]-indole as a hydroscopic powder that liquifies at 80–85° and crystallizes with 2 mols of water.

The starting material is obtained as follows:

9.36 g. N',N'-diethyl-N⁴-phenyl-1,4 - diamino-pentane are dissolved in 40 ml. 2 N aqueous hydrochloric acid and 4.8 ml. glacial acetic acid and cooled to 5°. A solution of 3.04 g. sodium nitrite in 25 ml. water is added dropwise keeping the temperature between 5–10°. Stirring is continued for an additional two hours at 0–10°, then 20 ml. glacial acetic acid are added. 18 g. zinc dust are added in portions, keeping the temperature between 20 and 30° and stirring is continued at room temperature for 10 hours. The reaction mixture is filtered, made alkaline by addition of 120 ml. 10 N aqueous sodium hydroxide and extracted with ether. The ether solution is dried and evaporated to dryness. The residue is distilled under reduced pressure. The N'-phenyl-N'-(5'-diethylamino-2'-pentyl)-hydrazine boils at 135–142° at 1 mm./Hg.

Example 39

0.72 g. 3-nitro - 10-(2' - diethylamino-ethyl)-thianaphtheno[3,2-b]indole is suspended in 60 ml. ethanol and reduced with raney nickel and hydrogen. 135 ml. hydrogen at 0° and 760 mm./Hg. are taken up. During the reduction the nitro base dissolves. The solution is filtered and concentrated under reduced pressure. The oily residue is dissolved in ethyl acetate and the dihydrochloride of 3-amino-10-(2' - diethylamino-ethyl) - thianaphtheno-[3,2-b]indole precipitated by addition of anhydrous hydrochloric acid. The product is filtered off and recrystallized from an ethanol-ether mixture. It then melts at 214° (with decomposition).

Example 40

4.83 g. of 7-fluoro-thianaphtheno[3,2-b]indole are refluxed with 0.8 g. sodamide in 35 ml. toluene for four hours. 2.68 g. of 1-dimethylamino-2-propyl chloride in toluene solution are added and the mixture kept at 55–60° for four hours. The reaction mixture is cooled to room temperature and filtered. The filtrate is evaporated to dryness, the oily residue is dissolved in ethyl acetate and the hydrochloride of 7-fluoro-10-(2'-dimethylamino-propyl)-thianaphtheno[3,2-b]indole precipitates by addition of anhydrous hydrochloric acid. After recrystallization from methanol it melts at 267–271° (with decomposition).

The starting material is obtained as follows:

29.5 g. of m-fluoro-thiophenol are dissolved in a solution of 21.2 g. of sodium hydroxide in 22 ml. water and 90 ml. ethanol. A solution of 24 g. of chloro-acetic acid in 40 ml. of ethanol is added. After stirring the warm solution for one hour, the reaction mixture is refluxed for two hours and then worked up as described in Example 32. After recrystallization from benzene-hexane the m-fluoro-phenyl thioglycollic acid melts at 75–77°.

22.7 g. of m-fluoro-phenyl thioglycollic acid in 56.5 ml. of tetrachloro-ethane are treated with 17.8 g. of phosphorous trichloride as described in Example 32, then reacted with 17.9 g. of powdered aluminum chloride in 113 ml. of tetrachloroethane and worked up as described in Example 32. The 6-fluoro-3-hydroxy-thianaphthene thus obtained melts at 92–95°. It can be reacted directly with phenyl hydrazine as follows:

13.45 g. of the 6-fluoro-3-hydroxy-thianaphthene are dissolved in 135 ml. of glacial acetic acid with heating, 9.5 g. of phenyl hydrazine are added and the reaction mixture heated for one hour on the steam bath. During this time the product separates. The reaction mixture is allowed to cool and the product, 7-fluoro-thianaphtheno-[3,2-b]indole, M.P. 261–264°, is filtered off. It is recrystallized from methyl ethyl ketone.

Example 41

2.74 g. of 7-methoxy-10-(6'-bromohexyl) - thianaphtheno[3,2-b]indole are dissolved in 15 ml. of benzene with heating. 1.24 g. of piperidine are added and the mixture refluxed on the steam bath for one and one half hours. After cooling the reaction mixture is filtered and the filtrate concentrated under reduced pressure. The oily residue is dissolved in ethyl acetate and the tartrate precipitated by adding a solution of d-tartaric acid in ethyl acetate. The tartrate of 7-methoxy-10-(6-piperidinohexyl)-thianaphtheno[3,2-b]indole thus obtained melts at 81–85°.

The starting material can be obtained by reacting 1,6-dibromohexane with 7 - methoxy-thianaphtheno[3,2-b]-indole according to the procedure outlined in Example 31 for the preparation of 10-(2'-bromoethyl)-7-methoxy-thianaphtheno[3,2-b]indole.

Example 42

11.2 g. of thianaphtheno[3,2-b]indole are suspended in 85 ml. toluene. 1.95 g. of sodamide are added and the reaction mixture stirred with refluxing for four hours. A solution of 6.69 g. of 3-dimethylamino-propyl chloride is added, and stirring and refluxing are continued for four hours. The reaction mixture is worked up as described in Example 16. After recrystallization from isopropanol the hydrochloride of 10-(3'-dimethylamino-propyl)-thianaphtheno[3,2-b]indole melts at 189–191°.

Example 43

By substituting 9-chloro-thianaphtheno[3,2-b]indole for the 6-chloro-thianaphtheno[3,2-b]indole and proceeding in the manner described in Example 25, 9-chloro-10-(2'-dimethylaminopropyl)-thianaphtheno[3,2-b]indole hydrochloride is obtained. It melts after recrystallization from isopropanol at 252–255°.

The starting material can be obtained as follows:

18.5 g. of 4-chloro-3-hydroxy-thianaphthene are dissolved in 180 ml. glacial acetic acid. 11 g. of phenylhydrazine are added and the reaction mixture heated for one hour on the steam bath. The reaction mixture is cooled, filtered, and concentrated under reduced pressure, whereby the product crystallizes. The thus obtained 9-chloro-thianaphtheno[3,2-b]indole after recrystallization from ethanol melts at 124–128°.

Example 44

7.3 g. of 8,9-dichloro-thianaphtheno[3,2-b]indole are refluxed with 1.0 g. of sodamide in 45 ml. of toluene for four hours. 3.05 g. of 1-dimethylamino-2-propyl chloride in toluene solution are added and the mixture stirred and refluxed for four hours. The reaction mixture is then worked up as described in Example 37. After recrystallization from ethanol the hydrochloride of 8,9-dichloro-10-(2' - dimethylamino - propyl) - thianaphtheno[3,2 - b] indole melts at 272–274°.

The starting material can be prepared as follows:

To a solution of 37 g. the crude mixture of 4,5- and 5,6-dichloro-3-hydroxy thianaphthene, are added 20 g. of phenylhydrazine. The reaction mixture is heated for one hour and then cooled to room temperature overnight. The crystalline material is filtered off and recrystallized from benzene, yielding 15.7 g. of 7,8-dichlorothianaphtheno[3,2-b]indole, M.P. 247–249°, which is used as starting material in Example 37. The acetic acid mother liquors are concentrated under reduced pressure and give a second crop of crystalline material, which after recrystallization from benzene melts at 188–190° and corresponds to the desired 8,9-dichloro-thianaphtheno[3,2-b]indole.

Example 45

16.1 g. of 8-methyl-10-(2'-dimethylamino-propyl)-thianaphtheno[3,2-b]indole are dissolved in 400 ml. of anhydrous ether with heating. To this solution is added a solution of 7.5 g. d-tartaric acid in 75 ml. isopropanol whereupon the d-tartrate of 8-methyl-10-(2'-dimethylamino-propyl)-thianaphtheno[3,2-b]indole precipitates. It melts at 115° (with decomposition). It can be recrystallized from isopropanol.

The starting material can be prepared according to the directions given in Example 27.

The process for the preparation of the new compounds comprises generally introducing into the 10-position of a 10-unsubstituted thianaphtheno[3,2-b]indole the radical $R_1X-$, wherein $R_1$ stands for an amino or quaternary ammonium group and X for a lower hydrocarbon radical.

The introduction of this residue may be carried out directly or stepwise. The direct introduction may be accomplished by reacting the thianaphtheno-indole unsubstituted in 10-position with a reactive ester of an alcohol of the formula: $R_1X-OH$, wherein $R_1$ and X have the aforesaid meaning. To this end, the thianaphtheno-indole may be used in the form of a metal salt thereof such as the sodium salt, or in the presence of a condensing agent, especially one which is capable of forming a metal salt therewith, such as an alkali metal or alkaline earth metal, for example sodium, lithium or calcium or an amide, hydride, hydrocarbon compound or alcoholate thereof, such as sodamide, sodium hydride, lithium butyl, potassium phenyl, lithium phenyl, potassium tertiary butylate or potassium tertiary amylate. Reactive esters of the alcohol $R_1X-OH$ are especially those of strong inorganic or organic acids such as hydrohalic acids, e.g. hydrochloric acid or organic sulfonic acids such as p-toluene sulfonic acid.

In the step-wise introduction of the radical $R_1X-$ a radical convertible into $R_1X-$ is introduced into the 10-position of a 10-unsubstituted thianaphtheno-indole and then converted into $R_1X-$.

To that effect a radical $R_2X-$ may be introduced wherein $R_2$ is a radical convertible into an amino or ammonium group and $R_2$ is then converted into $R_1$. The radical $R_2$ may be a reactive esterified hydroxy group, for example, a halogen atom, or a nitrile group or a tertiary amino group.

The introduction of such residue $R_2X-$ may be achieved in various ways. Thus, the 10-unsubstituted thianaphtheno-indole may be reacted with a reactive ester of an alcohol of the formula: $R_2X-OH$ as indicated above, or with a compound $R_2X_1$, wherein $X_1$ is a lower hydrocarbon radical containing an activated multiple carbon-to-carbon bond capable of reacting with the indole amino group with addition, preferably in the presence of a basic condensing agent such as oxides, hydroxides, alcoholates, hydrides or amides of alkali or alkaline earth metals or the metals themselves. Other condensing agents are quaternary ammonium hydroxides such as benzyl-trimethylammonium hydroxide.

For example, the 10-unsubstituted thianaphtheno-indole may be reacted with a tertiary amino-alkyl halide, a hydrohalic or sulfonic acid ester of a halogenoalkanol or an acrylonitrile. Thereafter, the substituent $R_2$ convertible into $R_1$ is so converted. A halogen atom for example is converted into an amino or quaternary ammonium group by treatment with an appropriate amine and a nitrile group is converted into an amino group by reduction and a tertiary amino group may be converted into a quaternary ammonium group by quaternization. In the compounds obtained, it is also possible to substitute an amino group having one or more hydrogen atoms, to obtain a secondary or tertiary amino group. Thus a primary amine may be reacted with a ketone, such as cyclopentanone or cyclohexanone to form the corresponding methylidene-amino compound, which is then reduced to the secondary amine. This may be converted into a tertiary amine, for example by reaction with formaldehyde and formic acid. These reactions are carried out in the conventional manner employing appropriate conditions.

In the stepwise introduction of the radical $R_1X$ it is also possible to introduce first a radical $R_3X_2-$ wherein $R_3$ stands for $R_2$ or $R_1$ and $X_2$ is a radical convertible into X. $X_2$ may be, for example, a lower hydrocarbon radical containing a carbonyl group, which, after the introduction of the radical $R_3X_2-$, is reduced to a methylene group. Thus, a 10-unsubstituted thianaphtheno[3,2-b]indole may be condensed with a halogeno lower fatty acid amide, for example a chloro-acetic acid amide such as chloroacetic acid piperidide and the carbonyl group is then reduced, e.g. by treatment with lithium aluminum hydride.

The starting materials are known or can be obtained according to methods analogous to those for the preparation of known compounds of these types.

The invention also comprises any modification of the processes wherein a compound obtainable as an intermediate at any stage of the process is used as starting material and the remaining step(s) of the process are carried out, as well as any new intermediates.

In the process of this invention such starting materials are preferably used which lead to final products mentioned in the beginning as preferred embodiments of the invention.

This application is a continuation-in-part of my co-pending applications, Serial Nos. 550,772 (now abandoned) and 574,394 (now abandoned), filed December 2, 1955, and March 28, 1956, respectively.

What is claimed is:

1. Compounds of the class consisting of a base of the following formula

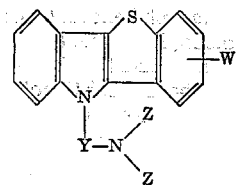

wherein Y is lower alkylene, each Z is a member selected from the group consisting of lower alkyl, oxa lower alkylene, aza lower alkylene, thia lower alkylene, cyclopentyl, cyclohexyl, cycloheptyl, cyclopentylmethyl and cyclohexylmethyl and W is a member selected from the group consisting of hydrogen, halogen, lower alkyl and lower alkoxy, therapeutically useful acid addition salts and lower alkyl quaternary ammonium salts thereof.

2. A compound of the formula

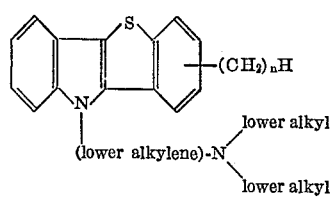

wherein $n$ is an integer from 1 to 7, both inclusive.

3. A compound of the formula

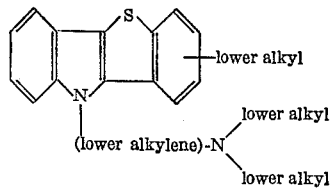

4. A compound of the formula

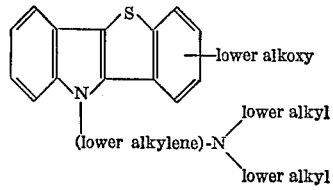

5. A compound of the formula

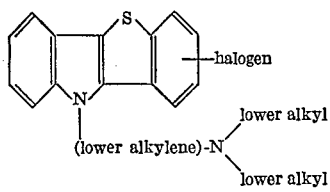

6. 7-Halogen - 10 - (2' - dimethylaminopropyl)-thianaphtheno[3,2-b]indole.
7. 7-Lower alkyl-10-(2'-dimethylaminopropyl) - thianaphtheno[3,2-b]indole.
8. 7-Lower alkoxy-10-(2'-dimethylaminopropyl)-thianaphtheno[3,2-b]indole.
9. 10 - (2' - dimethylamino - propyl) - thianaphtheno-[3,2-b]indole.
10. 7-bromo - 10 - (2' - dimethylamino-propyl)-thianaphtheno[3,2-b]indole.
11. 8-methyl - 10 - (2' - dimethylamino-propyl)-thianaphtheno[3,2-b]indole.
12. A member selected from the group consisting of
7-chloro-thianaphtheno[3,2-b]indole,
7-methoxy-thianaphtheno[3,2-b]indole,
3,7-dichloro-thianaphtheno[3,2-b]indole,
3-chloro-7-methoxy-thianaphtheno[3,2-b]indole,
3-chloro-7-ethoxy-thianaphtheno[3,2-b]indole,
3-chloro-thianaphtheno[3,2-b]indole,
7-bromo-thianaphtheno[3,2-b]indole,
2,7-dichloro-thianaphtheno[3,2-b]indole,
2-chloro-thianaphtheno[3,2-b]indole,
4-chloro-thianaphtheno[3,2-b]indole,
8-bromo-thianaphtheno[3,2-b]indole,
8-fluoro-thianaphtheno[3,2-b]indole,
7,8-dichloro-thianaphtheno[3,2-b]indole and
3,7-dimethoxy-thianaphtheno[3,2-b]indole.

13. The tartrate of 8-methyl-10-(2'-dimethylaminopropyl)-thianaphtheno[3,2-b]indole.

References Cited in the file of this patent
UNITED STATES PATENTS 2,061,186    Cole _____ Nov. 17, 1936

FOREIGN PATENTS 503,135    Germany _____ July 25, 1930

OTHER REFERENCES

Beil: Hand der Org. Chem., vol. 6, 4th ed., 2nd supp. (1944), page 298.
Chemical Abstracts, vol. 47 (1953), pages 32s (subject index).
Sugh et al.: Kyoto Daigaku Kagaku Kenkyu-Jo Hokoku, vol. 31, No. 1, pages 27–33, January 1953.
Hartough: Compounds With Condensed Thiophene Rings (1954), Interscience Publ., New York, pages 76–79 and 411–413.
Werner et al.: J. American Chem. Soc., vol. 79, pages 1675–1682 (1957).
Dalgliesh et al.: Chem. Abst., vol. 41, col. 6238 (1947).
Buu-Hoi et al.: Chem. Abst., vol. 47, col. 1124 (1953).